No. 616,561.  Patented Dec. 27, 1898.
R. RUNEBERG.
MEANS FOR MOUNTING RUDDERS.
(Application filed Nov. 29, 1897.)
(No Model.)
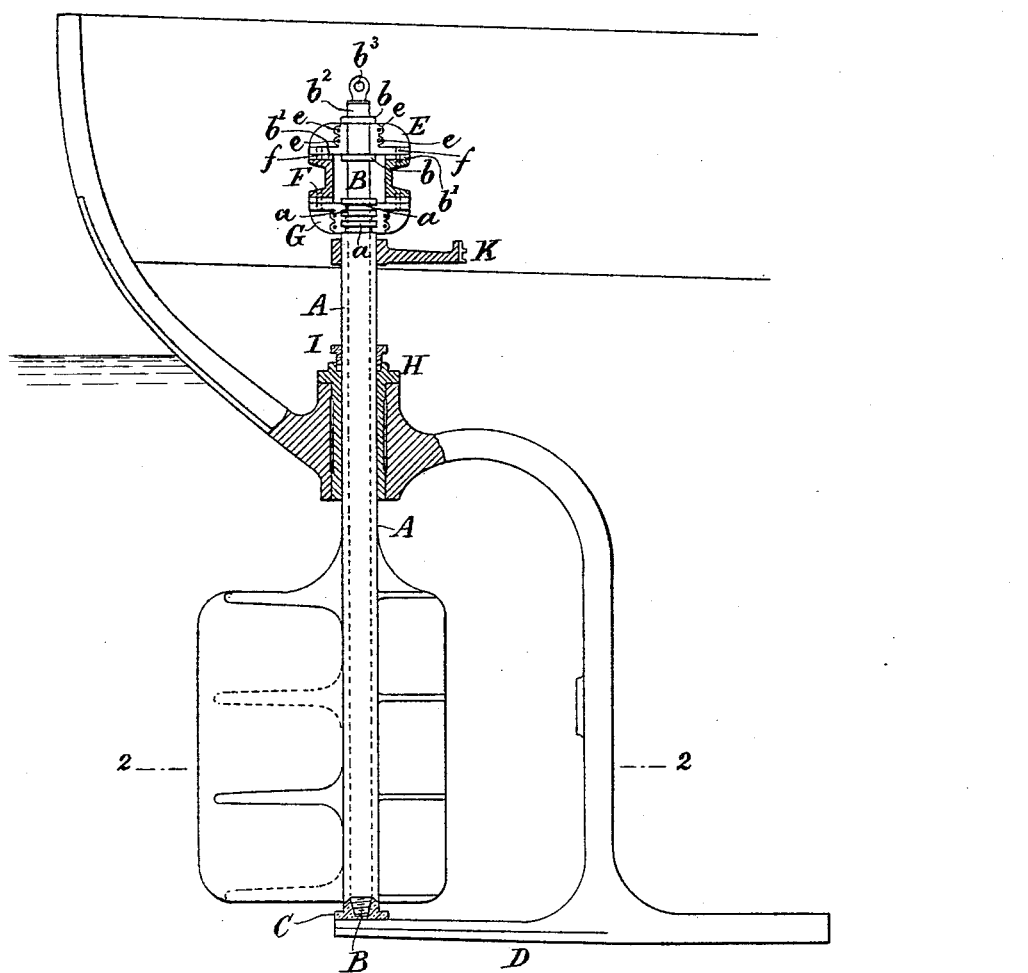

UNITED STATES PATENT OFFICE.

ROBERT RUNEBERG, OF ST. PETERSBURG, RUSSIA.

MEANS FOR MOUNTING RUDDERS.

SPECIFICATION forming part of Letters Patent No. 616,561, dated December 27, 1898.

Application filed November 29, 1897. Serial No. 660,151. (No model.)

*To all whom it may concern:*

Be it known that I, ROBERT RUNEBERG, a subject of the Emperor of Russia, residing at Bureau Vega, 57, Liteinÿ Perspective, St. Petersburg, in the Empire of Russia, have invented certain new and useful Improved Means for Mounting Rudders, (in respect whereof I have obtained Letters Patent in Great Britain, dated August 4, 1897, No. 18,191; in Germany, No. 96,098, dated June 18, 1897; in Denmark, No. 1,696, dated June 29, 1898; in Norway, No. 6,066, dated February 28, 1898; in Sweden, No. 8,735, dated February 3, 1898; in Italy, No. 329, Vol. XC, R. A., dated December 18, 1897, and in Russia, No. 2,518, dated July 28, 1897,) of which the following is a specification.

This invention relates to the mounting of rudders of the balance type; and it consists in the employment of a hollow rudder-head, through which is passed a cylindrical rudder-post.

The great superiority of the balance-rudder over the usual form is generally admitted, but its use is to a certain extent limited, owing to the difficulty experienced in fitting a strong rudder-post. It has frequently been the practice to omit the rudder-post, thereby considerably weakening the construction, and sometimes to bend the rudder-post to afford space for the balance-rudder. This latter arrangement, although preferable, leaves much to be desired as regards solidity of construction, and it is absolutely inadmissible where the ship may have to navigate in ice, which easily gets in between the rudder and the rudder-post, preventing the maneuvering of the rudder.

The present improvements are designed to overcome the above objections and to afford a rational and solid construction of balance-rudder.

In the accompanying drawings, Figure 1 is a vertical section through the ship's stern. Fig. 2 is a horizontal section on the line 2 2 in Fig. 1, and Fig. 3 is a plan of the upper bearing for the rudder-head.

The rudder-head A is made hollow and is passed over the cylindrical rudder-post B. This rudder-post is preferably conical at its lower end, where it is screwed into the nut or block C. The post may, however, be cylindrical throughout its length. The nut or block C is preferably formed of gun-metal and is riveted to the prolongation D of the keel. The upper end of the rudder-post is provided with collars *b b*, between which the clamp or bearing E is fixed. This bearing is made in two halves secured together by means of bolts *e e e e* and is attached to the beams F by other bolts *f f f f*, the beams being in turn fastened to the sides of the ship. In order to facilitate the fitting of the bearing, packing *b'* of wood may be interposed between the bearing and the beams. This mode of fixing the rudder-post is given as an example only, as it will be obvious that various other methods may be adopted. The upper extremity of the hollow rudder-head is provided with collars *a a a*, which fit into recesses formed in the bearing G, the latter being constructed in two halves and fitted together and attached to the beams F in a similar manner to the bearing E. In ordinary working the bearing G is so adjusted as to permit free turning of the rudder-head, while the bearing E, on the contrary, is screwed up tight in order to prevent any movement of the rudder-post. It will be seen that the bearing G carries the weight of the rudder, thereby diminishing wear at the lower end. The hollow rudder-head may have a bearing on the rudder-post along the whole of its length or at certain intervals only.

The hollow rudder-head is carried through a removable bush H, furnished with a stuffing-box I, the latter tending to exclude water from the stern part of the ship.

The arrangement shown in the drawings is specially adapted for employment with a vessel intended for navigating in ice-covered water, wherein the rudder is required to be kept as low as possible. For ships intended for ordinary navigation a similar arrangement may be adopted, the usual funnel for the rudder-head being substituted for the bush H and the stuffing-box I.

The rudder is operated through the segment K, which is fixed to the hollow rudder-head and receives motion from the steering-gear in the usual way.

When it is desired to unship the rudder, the bearing E is detached, the rudder-post being then screwed up from the nut or block C by means of a spanner applied to the square portion $b^2$ at its upper extremity. The rudder-post may now be lifted out of the rudder-head by means of the eyebolt $b^3$. The bearing G, segment K, and bush H may also be removed, whereby the rudder is rendered free to be unshipped in the usual way.

What I claim as my invention, and desire to secure by Letters Patent, is—

1. The herein-described means for mounting balance-rudders, consisting in providing the rudder with a hollow head through which the rudder-post is passed, the latter being supported at one end by the hull and at the other end by a prolongation of the keel.

2. In a balance-rudder, a hollow rudder-head A and a rigid rudder-post B passing through said head, the former being mounted in a bearing G and capable of rotary movement, while the latter is held between a bearing E and a prolongation D of the keel.

ROBERT RUNEBERG.

Witnesses:
M. DIXON,
E. DOURIE.